Oct. 15, 1946.  A. J. BERNESKI  2,409,184
GENERATOR CONSTRUCTION
Filed March 3, 1945

WITNESSES:
N. F. Susser
Wm. L. Groome

INVENTOR
Anthony J. Berneski.
BY O. D. Buchanan
ATTORNEY

Patented Oct. 15, 1946

2,409,184

UNITED STATES PATENT OFFICE 2,409,184

GENERATOR CONSTRUCTION

Anthony J. Berneski, Latrobe, Pa., assignor to Westinghouse Electric Corporation, East Pittsburgh, Pa., a corporation of Pennsylvania Application March 3, 1945, Serial No. 580,879

1 Claim. (Cl. 171—324)

My invention relates to rocker-ring mountings for commutator-type dynamo-electric machines, and while my invention is of general application, it is more particularly designed for machines in which space-requirements are at a premium, and in which it is necessary to occasionally loosen the clamping-means for the rocker-ring, in order to angularly adjust the rocker-ring within the machine, so as to properly position the brush-rigging with respect to the commutator. More particularly still, my invention was designed for a partially enclosed generator, with a drip-proof front endbell.

The object of the invention is to provide an improved rocker-ring clamping-means, having removable segments which are bolted to the inner periphery of the front frame-ring, after the rocker-ring, with its attached brushholder-assembly, has been put in place, and before the front endbell has been secured to the machine. In this way, I provide an abutment against which the rocker-ring may be clamped, by clamps which are subsequently accessible through the removable commutator-covers of the machine.

Figure 1:
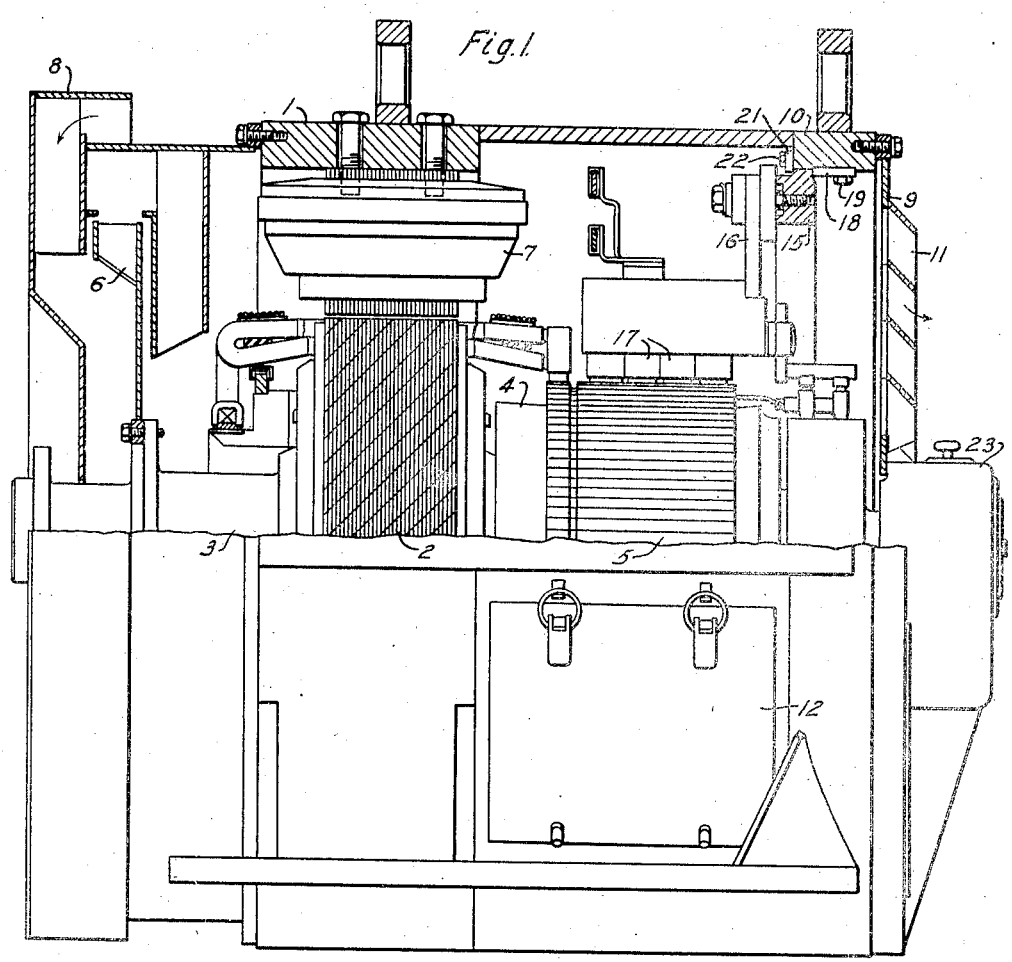
Figure 2:
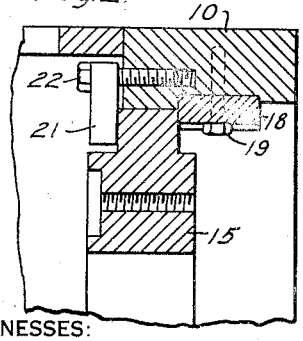
Figure 3:
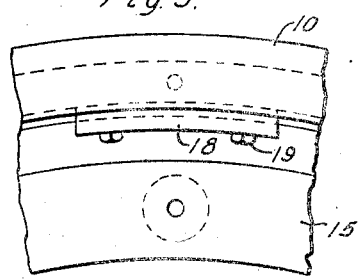

With the foregoing and other objects in view, my invention consists in the parts, structures, combinations, and assemblies, hereinafter described and claimed, and illustrated in the accompanying drawing, wherein Figure 1 is a longitudinal view, partly in section and partly in elevation, showing a three-wire direct-current generator embodying my invention, and Figs. 2 and 3 are detail views of the improved rocker-ring clamping means and of the removable segmental abutments for the rocker-ring.

In Fig. 1, I have illustrated my invention as being applied to a three-wire direct-current generator, having a frame 1, and a rotor member 2 which is mounted on a shaft 3. The rotor member 2 comprises an armature 4, a commutator 5, and a blower 6. The frame 1 has field windings 7, a rear-end air-intake 8, and a removable front endbell 9, which is removably attached to the front frame-ring 10. The front endbell 9 has louvred air-outlets 11, which are illustrated as being inclined, so as to make the generator drip-proof. The generator frame 1 also has removable commutator-covers 12, through which access may be had to the space around the commutator 5, while the machine is in service.

Mounted within the front frame-ring 10 is the rocker-ring 15, toward which my present invention is especially directed. The rocker-ring 15 insulatingly supports a brushholder-assembly comprising brushholder brackets 16 and brushes 17. This entire brushholder-assembly, including the rocker-ring 15, must be inserted into the machine from the front end thereof, before the front endbell 9 is attached in place.

According to my present invention, a plurality of removable segments 18 are removably secured to the inner periphery of the front frame-ring, as by means of bolts 19, after the rocker-ring 15, with its brushholder-assembly, has been inserted in the machine, and before the front endbell 9 has been attached to the machine-frame 1. The front endbell 9 is then secured to the front frame-ring 10.

I also provide rocker-ring clamps 21, which are accessible through the commutator covers 12, to clamp the rocker-ring 15 back against the shoulders which are provided by the removable segments 18, clamping-bolts 22 being utilized for this purpose.

In operation, when the machine is in service, if it is necessary to adjust the angular position of the brushes 17 with respect to the commutator 5, it is only necessary to remove the commutator covers 12, and reach in and loosen the clamping-bolts 22, after which the rocker-ring 15 may be rotated to its desired adjusted position, after which the clamping-bolts can be retightened, thus drawing the clamps 21 against the face of the rocker-ring 15, and again holding the latter securely in place. It will be observed that this adjustment is accomplished by clamps 21, and clamping-bolts 22, which are altogether accessible from the spaces covered by the removable commutator covers 12, so that there are no loose parts, back of the rocker-ring 15, that is, between the rocker-ring 15 and the front endbell 9, so that it is not necessary to remove the front endbell 9, which supports the front end of the rotor-shaft 3, through a bearing 23. At the same time, the provision of the removable abutment-segments 18 makes it possible to assemble the brush-holder structure in the first place, that is, in the factory, before the front endbell 9 is assembled on the machine.

I claim as my invention:

A commutator-type dynamo-electric machine having a frame having a front frame-ring and a removable front endbell, and a rotor-member having a commutator, said frame having a rocker-ring fitting within the inner periphery of said front frame-ring, a brush assembly carried by said rocker-ring, a plurality of removable segments removably secured to the inner periphery of said front frame-ring in position to provide abutments for said rocker-ring, and clamps engaging the opposite face of said rocker-ring and tightenable to clamp said rocker-ring against said abutment-segments.

ANTHONY J. BERNESKI.